March 10, 1931.  G. S. MOORE ET AL  1,796,211
AUTOMATIC RETRIEVER FOR TROLLEYS
Filed Oct. 2, 1929
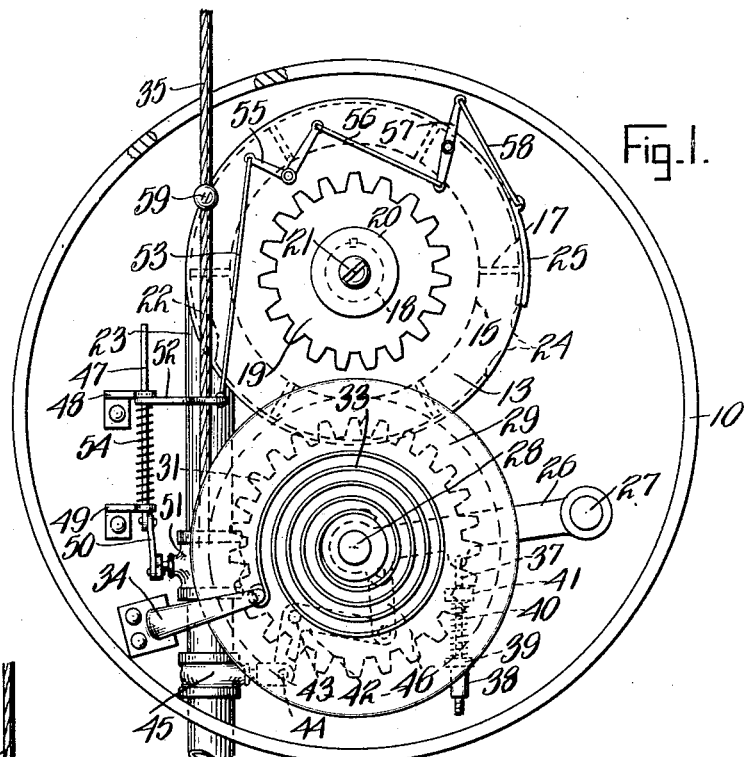
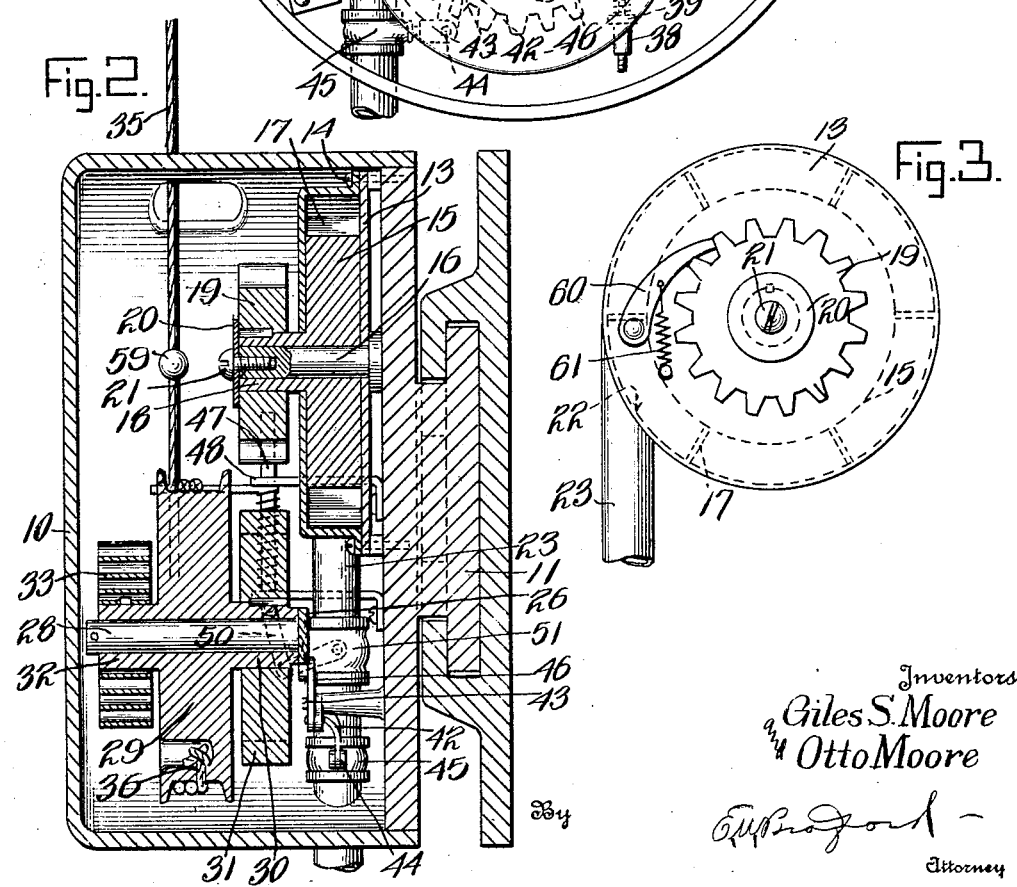
Inventors
Giles S. Moore
and Otto Moore
Attorney Patented Mar. 10, 1931

1,796,211

UNITED STATES PATENT OFFICE

GILES S. MOORE, OF INDIANAPOLIS, AND OTTO MOORE, OF FRANKFORT, INDIANA

AUTOMATIC RETRIEVER FOR TROLLEYS

Application filed October 2, 1929. Serial No. 396,791.

This invention relates to mechanisms for retrieving trolley poles. An object of the invention is to provide a device for use in restoring a trolley shoe to the trolley pole of electric railway cars or other electrically driven vehicles such, for example, as trackless trolley busses.

Referring to the accompanying drawings, which are made a part hereof and on which similar reference characters indicate similar parts, Figure 1 is a plan view of the device, Figure 2, a section on line 2—2 of Figure 1, and Figure 3, a modified form of locking mechanism for a part of the device.

In the drawings numeral 10 indicates a housing which may be secured to the rear of a trolley car by means of a flanged socket 11. A fluid motor casing 13 may be secured within and to the housing by means of bolts or screws 14. A piston 15 is mounted to rotate upon a shaft 16 which shaft is secured to the housing 10. The piston 15 is provided with vanes 17 which form fluid tight engagement with the outer wall of the casing 13. The piston 15 has a stub shaft 18 extending out of the casing 13 and this stub has a pinion 19 secured thereon. A washer 20 secured to the shaft 16 by means of screw 21 holds the pinion 19 upon the stub 18. The motor casing 13 is provided with a fluid inlet at 22 to which is connected a fluid conduit 23. A fluid outlet from the motor casing is shown at 24 which outlet is controlled by a slide 25, the operation of which will later be described.

An arm 26 is pivoted upon the base of the housing at 27. A shaft 28 is mounted on the inner end of this arm and this shaft has a pulley 29 rotatably mounted thereon. The pulley 29 has on its inner end a stub 30 to which a pinion 31 is keyed. To the stub 32 is secured one end of a coiled spring 33, the other end of the spring being secured to a bracket 34 which in turn is fastened to the housing 10. A cable 35 is secured to the pulley at 36 and is wound around the pulley a number of times. The upper end of the cable 35 is attached to a trolley pole, not shown. To a lug on the side of the arm 26 is secured a link 37. The outer end of this link is screw-threaded to receive an adjusting nut 38, the nut seating against a washer 39. A compression spring 40 is positioned between the washer 39 and a post 41 on the base. The purpose of the compression spring is normally to hold the arm 26 carrying the pinion 31 away from the pinion 19, as will later appear. A rock arm 42 is pivoted to the housing at 43, one end of the rock arm being pivoted at 44 to the stem of a valve 45. The other end of the rock arm is pivoted to a link 46 which is secured to the arm 26. When the arm 26 is rocked on its pivot 27 the rock arm will be rocked to operate the valve 45. A rod 47 is slidably mounted in brackets 48 and 49 secured to the housing of the mechanism. One end of the rod is attached to one end of a lever 50, the other end of which is secured to a rotary valve 51 in the fluid conduit 23. A bracket 52 is also secured upon the rod 47 at one end and at its other end is attached to a link 53. A compression spring 54 is positioned between the bracket 49 and the arm 52 to normally hold the rod 47 in a forward position, as shown in Fig. 1. The link 53 is attached to one arm of a rock arm 55, to the other arm of which is attached a link 56. The link 56 in turn is attached to one end of a lever 57, to the other end of which is attached a link 58. The link 58 is attached to the slide 25 for controlling the outlet 24 from the motor casing 13. A lug 59 is secured upon the cable 35.

The operation of the device as described so far is as follows: When the trolley pole becomes disengaged from the trolley it pulls up on the cable 35 unwinding cable 35 from the pulley 29 and at the same time winding up spring 33 to put this spring under increased tension. When the cable 35 has become unwound from pulley 29 this pulley is pulled upward until the teeth of pinion 31 mesh with the teeth of pinion 19. As the lever 29 swings up it opens the valve 45 by means of the link 46 and the rock arm 42. As the cable 35 moves upward the lug 59 moves up to allow the spring 54 to open the valve 51. As the valve 45 is opened therefore compressed air from a suitable tank on the vehicle is delivered to the motor to drive it in a clockwise direction as shown in Fig. 1. This drives the pulley in a counter-clockwise direction to wind up the cable 35 and pull down the trolley pole. When the cable is pulled down the lug 59 engages the bracket 52 and pushes down the rod 47 to partially close the valve 51. At the same time the link and lever mechanism 53, 55, 56, 57 and 58 closes the exhaust port 24. This locks the motor and holds the cable 35 tight. When the trolley pole is replaced on the trolley by the operator the downward pull on the cable 35 allows the spring 40 to pull the pinion 31 away from the pinion 19 and also to close the valve 45. As the lug 59 moves up of course the valve 51 is allowed to open but since the valve 45 is closed the motor is not operated.

In Figure 3 is shown a modified form of locking device for the pinion 19. This consists of a latch 60 which is pivoted on the motor casing and engages with a tooth on the pinion. A spring 61 holds the latch in engagement with the pinion. With this form of the device the link lever mechanism 53, 55, 56, 57, 58, and slide 25 are not needed and the exhaust port 24 remains always open. It is necessary, however, to have the valve 51 completely closed when the cable 35 is pulled down so as to prevent unnecessary escape of compressed air from pipe 23. When the pole has been pulled down it is necessary to shut off compressed air from the motor. If the motor continued to operate it would wind up the cable 35 until it would possibly break the trolley pole.

It will be obvious to those skilled in the art that various changes may be made in our device without departing from the spirit of the invention and therefore we do not limit ourselves to what is shown in the drawings and described in the specification, but only as indicated in the appended claims.

Having thus fully described our said invention, what we claim as new and desire to secure by Letters Patent, is:

1. A retriever for trolley poles comprising a pivoted arm having a pulley rotatably mounted on its free end, a cable attached to a trolley pole at one end and at the other end to said pulley, a motor, means operable upon a disengagement of the trolley pole from the trolley for causing operation of the said motor, an operable connection between said pulley and said motor whereby operation of the motor will drive the pulley to pull down the trolley pole preparatory to its reengagement with a trolley and means for locking said trolley pole in the pulled-down position, substantially as set forth.

2. A retriever for trolley poles comprising a pivoted arm, a pulley rotatably mounted thereon, a cable having one end wound around said pulley and attached at its other end to a trolley pole, a pinion on the said pulley, a fluid motor, a pinion on said fluid motor, a fluid inlet to the said motor, means operated by the said cable upon disengagement of the trolley pole with the trolley for causing operation of the said motor to operate the pulley to pull down the trolley pole in position for reengagement with the trolley, and means for locking the motor to hold the trolley pole in its lowered position until placed on the trolley, substantially as set forth.

3. A retriever for trolley poles comprising a housing, a motor within said housing, an arm pivoted to said housing, a pulley mounted on said arm, a cable wound around said pulley at one end and having its other end attached to a trolley pole, a fluid conduit to the said motor, a valve controlling admission of fluid through the conduit to the motor, means operable by movement of the said arm for controlling said valve, the last named means being operable by disengagement of the trolley pole from the trolley to swing the pivoted arm, the swinging of the pivoted arm making operative connection between said motor and the said pulley to cause the pulley to rotate in a direction to pull down the trolley pole preparatory to its reengagement with the trolley, substantially as set forth.

4. A retriever for trolley poles comprising a housing, a fluid motor mounted within said housing, a fluid conduit to said motor, a valve controlling admission of fluid from said conduit to said motor, an arm pivoted to said housing provided with a connecting link for operating said valve, a pulley rotatably secured to the free end of said arm having a cable fixed thereto, the other end of said cable being attached to a trolley pole, resilient means secured to said pulley to check unwinding of said cable upon disengagement of said trolley pole from the trolley, means connecting said motor and said pulley adapted to wind said cable about said pulley thereby pulling said trolley pole down below said trolley, and means for locking said motor to hold said trolley pole in its lowered position until replaced on the trolley, substantially as set forth.

In witness whereof, we have hereunto set our hands at Indianapolis, Indiana, this 24th day of September, A. D. nineteen hundred and twenty-nine.

GILES S. MOORE.
OTTO MOORE.